Patented Dec. 19, 1933

1,939,937

UNITED STATES PATENT OFFICE 1,939,937

BRINE FOR THE TRANSMISSION OF HEAT AND COLD

Fritz Werner, Leipzig, Germany

No Drawing. Application December 31, 1931, Serial No. 584,281, and in Germany January 6, 1931

4 Claims. (Cl. 252—5)

In the case of brines for refrigerating purposes and for use as chemical carriers of heat, consisting of watery solutions of one or more metallic salts, it is the general practice to reduce as far as possible the corrosive action of these brines on the metal parts of the plant in question. It has been recognized that the maintainment of constant pH values, i. e., of the concentration of the hydrogen ions, favours this reduction of the corrosive action, and it has therefore been the custom to associate the brines with chemical regulators or buffers.

The refrigerating brines regulated in this manner, and possessing a greatly reduced activity, are however too expensive in comparison with the ordinary brines, because the chemically pure regulating means, which are completely dissolved in the brine, involve very considerable costs.

Further, the raw materials necessary for making refrigerating brines and chemical heat carriers consisting of watery solutions of salts, which are placed on the market partly as solid technical products and partly as waste lyes from chemical industries, always contain, as is well known, impurities of different kinds. Thus, for instance, these raw materials possess both organic and inorganic admixtures which impart to the individual watery solutions of said raw materials, i. e., to the base solutions of refrigerating brine, instead of the desired clear color a greenish, yellowish or other color, which can be eliminated only at considerable cost.

In the base solutions and also in the finished refrigerating brines are further contained colloids attributable to the raw materials, which colloids are especially undesirable in the refrigerating plants with rotating refrigerating drums. The colloids, which consist in part of saponaceous substances, result, either alone or in cooperation with small quantities of coarsely dispersed particles, for instance, silicates and insoluble carbonates, in very troublesome formations of foam or froth. Such froth forming in the brine can, on the one hand, impair the proper action of the brine pump, and on the other hand the froth will find its way into the ice cells and will there mix with the fresh water contained in these cells. Since the froth always contains traces of brine, the fresh water in the ice cells will in this way be made impure and at the same time the uniform freezing of this fresh water to a homogeneous block will be greatly impeded or even made impossible.

Also, the raw materials necessary for preparing brines frequently absorb odors from the vessels employed in manufacturing said raw materials or from the containers used in transporting or storing them, which odors can generally be traced to the carbolic acid contained in the protective coatings of paint on said vessels or containers. These odors in the raw material are imparted to the solutions and refrigerating brines, from which they can be removed only with considerable trouble. It is obvious that brine possessing an odor of the above-described nature will be extremely undesirable in plants handling food stuffs and the like, because many of these stuffs, for instance, meat, butter, cream etc. eagerly absorb the odor and thus become unsavory or even unsuited for consumption.

Finally, the raw materials or raw salts, and especially chloride of calcium, contain as technical impurities hypochlorides and chlorates. These impurities, which will therefore also be contained in the brine, will in course of time under atmospheric or other action result in the separation of active chlorine, which in the presence of water is one of the most virulent corrosives known and is therefore, even in very small quantities, a most unwelcome admixture to all refrigerating brines.

The present invention eliminates all the above disadvantages and makes possible the preparation of pure refrigerating brines which permanently and by their own action maintain their pure state, these brines having a minimal corrosive action and being very economical in use in consequence of their inexpensive manufacturing process.

It is by no means absolutely necessary to employ for the refrigerating brines or chemical heat carriers buffers or regulating means which entirely dissolve in the brine; it has been found that the presence of certain quite inexpensive substances in the brine, which substances are either quite insoluble or only slightly soluble, suffices to control or maintain constant the pH value, i. e., the concentration of the hydrogen ions in the brine.

Modern chemistry terms the non-molecular-dispersive substances which adsorb OH' ions acidoids, substances that adsorb the H' ions basoids and substances that adsorb the OH' and the H' ions ampholytoids.

According to the present invention, the refrigerating brine (or in general the fluid employed for transmitting heat or cold) is associated in suitable manner with acidoids or basoids or with both simultaneously, or with ampholytoids, for the purpose of reducing its corrosive action. The present invention further employs in the preparation of the brine adsorbents which need not be acidoids, basoids or ampholytoids.

Red coal (blood coal) is for instance a non-molecular-dispersive, absolutely insoluble ampholytoid, adsorbing H' and OH' ions with practically equal avidity. Other substances which may be used for the purpose of the present invention are, for instance, cellulose, which must be as free as possible of ashes, for instance, filtering paper, cotton, kaolin (porcelain earth), collodion, agar gelatine, basic ferric oxide ($Fe_2O_3$) and the like.

For the purposes of the present invention it suffices to add these substances, for instance, red coal, in a finely divided state to the brine, or simply to place them in a porous bag or pocket and hang this in the brine. It is also practicable to mix red coal or the like in the form of a powder with the protective paint employed for coating the walls and other parts of the plant. In all these cases the desired effect, i. e., the reduction of the corrosive activity of the brine, is attained by controlling and maintaining constant the pH value of the brine.

The substances employed according to the present invention for preparing the fluid for the transmission of heat and cold can be used in all possible intermediate stages, or as true acid, true base or true ampholytes.

With the help of this invention the permanent control of the pH value of the brine becomes an extremely simple matter. If for instance the bag filled with red coal has become superficially less effective in consequence of the adsorption of bases and acids (formation of saloids), it can be very easily exchanged for a fresh bag, in order to permanently maintain the activity of the brine as low as possible.

As adsorbent means for counteracting the disadvantages arising from impurities in the raw materials the following substances, which are not ampholytoids, can for instance be employed with advantage: carboraffin, bolus alba, Spanish earth, bentonite, all kinds of bleaching clays, silicious or infusorial meal and bauxite. These substances are especially useful for preventing the formation of foam or froth with the resulting disadvantages and also for obtaining perfectly clear and inodorous solutions, at the same time adsorbing all traces of chlorine. Of the substances mentioned above, carboraffin is a carboniferous adsorbent; bolus alba, according to Krczil, is the clay (alumina) frequently used for medical purposes and which essentially consists of hydrated aluminic silicate of varying composition; Spanish earth is the clay found at Xeres de la Frontera in Spain and contains aluminic silicate and varying proportions of soluble salts.

These adsorbents can be employed in the preparation of the brine in different ways. As already mentioned, they may for instance be added to the raw materials themselves or to a solution of the latter, either as a dry powder or in the form of a paste. Or again, the adsorbents in question may be added to the finished brine, either as powder or in the form of a paste or solution, for instance, by hanging a bag of porous material filled with the finely divided adsorbent into the brine. The same effect can also be obtained by mixing the adsorbent means with the protective paint employed to coat the walls or other parts of the refrigerating plant or machine. To this end said walls or parts may be coated twice, the first time with a protective ground layer containing an impermeable binding means and then with a cover layer containing a binding means to which has been added the acidoid, basoid, ampholytoid or an adsorbent. This binding means must be of such a nature that it will not counteract the action of the anti-corrosive additions made to the brine. Such a cover layer may, for instance, consist of a paint containing graphite, such as is employed in boilers as a protection against formation of fur.

The quantity of adsorbents required in each individual case will depend on the amount of impurities contained in the raw materials, and the choice of the adsorbent means will depend on the nature and characteristics of said impurities and also on the kind of metal employed in the construction of the plant or machine in which the brine is used.

The adsorbent action of the means in question is extremely great. Even a small addition of, for instance, silicious or infusorial meal to the base solution of a refrigerating brine will suffice to entirely adsorb the phenols imparted to it by the raw materials and to render the solution inodorous. Further, a small quantity of an adsorbent is sufficient to decolor the base solution to such an extent that the brine will appear after filtration as clear as crystal. Saponaceous substances and colloids, which tend to form froth and are therefore undesirable as brine carriers, will also be entirely eliminated by the adsorbents. Finally, the latter will remove every trace of active chlorine and its compounds, so injurious to all metal parts.

For the economical preparation of refrigerating brines or fluids for transmitting heat and cold it is especially advantageous to add the adsorbents to the raw material solutions and then to retain them in the filtering press during filtration, thereby again removing them from the solution.

According to the present invention, adsorbents, such as acidoids, basoids or ampholytoids may also be added to pastes or powders destined for the preparation of refrigerating brines.

It must further be mentioned that a protective colloid may also be combined in known manner with the refrigerating brines, pastes or powders, the choice of said colloid depending on the nature of the means according to the present invention employed and provided that these means do not already possess the properties of a protective colloid. Similarly, if desired, chemical buffers or regulators may also be added to the brine, paste or powder.

The following is given as an example of the preparation of a refrigerating brine, heat carrier or the like according to the present invention:

One part calcium chloride and two parts magnesium chloride are dissolved in water and the foreign salts, for instance, the ferric salts and the like, are then precipitated in known manner. Red or blood coal in the form of a very fine powder is then added to the solution; the latter is now thoroughly stirred for a considerable time, filtered and is then ready for use as brine. If after the brine has been in use for a long time the blood coal shows signs of saloid formation, then a bag filled with fresh blood coal is simply hung into the brine, thereby permanently eliminating all disadvantages resulting from impurities in the raw materials.

As other examples of this process, one may take any one of the following mixtures

|     |          | Kilograms |
|-----|----------|-----------|
| (1) | $MgCl_2$ | 22        |
|     | $CaCl_2$ | 6         |
|     | Water    | 22        |
| (2) | $K_2CO_3$ | 30       |
|     | Water    | 70        |
| (3) | $NaNO_3$ | 25        |
|     | Water    | 75        |
| (4) | NaCl     | 21        |
|     | Water    | 79        |

With any of these as a starting point, the following process is carried out:

The metallic oxides and earths insoluble in water are precipitated in well known manner by means of barium hydrate $Ba(OH)_2$. 100 g of barium hydrate are usually sufficient. After considerable time, that is to say, after about 12 hours to 2 days, 50 g of animal coal powder or 100 g of bolus alba are added, the powder being as finely grained as possible. The size of the powder particles should not exceed 1/10 mm. After the adsorbent selected for the purpose has been admixed, the solution is vigorously stirred for from one-half to two hours, until everything is intimately mixed. After this the mixture is filtered by means of any one of the many kinds of known filters, very good results are obtained with fine cloth filters. The brine is then ready, but before being used, it may be mixed with 1 kg. (per about 1000 kg. of brine) of animal coal powder, or ½ kg. of glowed graphite, or 2.3 kg. of Spanish earth, everything finely powdered as above. But it is also permissible to add these adsorbents later on, that is to say, after the brine has already been used for some considerable time.

What I claim as my invention, is:

1. A brine for the transmission of heat and cold containing water-insoluble adsorbents in fine and uniform dispersion.

2. A brine for the transmission of heat and cold containing water-insoluble carbons in fine and uniform dispersion.

3. A brine for the transmission of heat and cold containing water-insoluble mineral earths in fine and uniform dispersion.

4. A brine solution for the transmission of heat and cold containing a uniform dispersion of a water insoluble adsorbent.

FRITZ WERNER.